(12) United States Patent
Whitledge et al.

(10) Patent No.: US 9,993,992 B2
(45) Date of Patent: Jun. 12, 2018

(54) STRUCTURAL FABRIC USEFUL FOR LINING PIPE

(71) Applicant: Fyfe Co. LLC, San Diego, CA (US)

(72) Inventors: Jon Whitledge, San Diego, CA (US); Reymundo Ortiz, San Diego, CA (US)

( * ) Notice: Subject to any disclaimer, the term of this patent is extended or adjusted under 35 U.S.C. 154(b) by 322 days.

(21) Appl. No.: 14/690,265

(22) Filed: Apr. 17, 2015

(65) Prior Publication Data

US 2016/0303823 A1 Oct. 20, 2016

(51) Int. Cl.
| | |
|---|---|
| *F16L 55/16* | (2006.01) |
| *F16L 55/18* | (2006.01) |
| *B32B 5/26* | (2006.01) |
| *B32B 5/02* | (2006.01) |
| *F16L 9/14* | (2006.01) |

(Continued)

(52) U.S. Cl.
CPC .................. *B32B 5/26* (2013.01); *B32B 5/02* (2013.01); *B32B 5/022* (2013.01); *B32B 5/024* (2013.01); *B32B 5/06* (2013.01); *B32B 5/10* (2013.01); *B32B 5/12* (2013.01); *F16L 9/14* (2013.01); *F16L 55/1656* (2013.01); *F16L 57/02* (2013.01); *F16L 57/06* (2013.01); *F16L 58/00* (2013.01); *B32B 2250/05* (2013.01); *B32B 2250/20* (2013.01); *B32B 2260/021* (2013.01); *B32B 2260/046* (2013.01); *B32B 2262/0253* (2013.01); *B32B 2262/0269* (2013.01); *B32B 2262/10* (2013.01); *B32B 2262/101* (2013.01); *B32B 2262/106* (2013.01);

(Continued)

(58) Field of Classification Search
CPC ............... B32B 5/26; B32B 5/024; F16L 9/14
USPC ....................................................... 138/97, 98
See application file for complete search history.

(56) References Cited

U.S. PATENT DOCUMENTS

| | | | |
|---|---|---|---|
| 3,459,014 A | 8/1969 | Beming | |
| 4,009,063 A | 2/1977 | Wood | |

(Continued)

FOREIGN PATENT DOCUMENTS

| | | | |
|---|---|---|---|
| DE | 2753669 A1 | 10/1978 | |
| DE | 4403370 A1 | 8/1995 | |

(Continued)

OTHER PUBLICATIONS

Tube Forming System consisting of four photographs and description, admitted as prior art, 5 pages.

(Continued)

*Primary Examiner* — Vishal Pancholi
(74) *Attorney, Agent, or Firm* — Senniger Powers LLP

(57) ABSTRACT

A structural fabric suitable for lining pipes and pipes lined with the structural fabric. The fabric includes a strengthening layer laminated to a watertight layer. The strengthening layer may include carbon fiber bundles stitched to a watertight layer of woven glass fibers. In some embodiments, the strengthening layer includes lengthwise oriented carbon fiber bundles and widthwise oriented carbon fiber bundles bound together in a non-woven, non-crimp arrangement. The widthwise oriented bundles can have about three-times greater weight per unit area than the lengthwise oriented bundles. The watertight layer provides a watertight barrier when impregnated with the curable polymer, applied to the interior surface of the pipe, and cured. The watertight layer may include lengthwise and widthwise oriented bundles of glass fiber woven into one of a satin and twill weave.

23 Claims, 10 Drawing Sheets

(51) Int. Cl.
  *F16L 57/02* (2006.01)
  *F16L 57/06* (2006.01)
  *F16L 58/00* (2006.01)
  *F16L 55/165* (2006.01)
  *B32B 5/06* (2006.01)
  *B32B 5/10* (2006.01)
  *B32B 5/12* (2006.01)

(52) U.S. Cl.
  CPC ..... *B32B 2307/54* (2013.01); *B32B 2307/718* (2013.01); *B32B 2307/7265* (2013.01); *B32B 2597/00* (2013.01)

(56) References Cited

U.S. PATENT DOCUMENTS

| | | | |
|---|---|---|---|
| 4,836,715 A * | 6/1989 | Wood | F16L 55/1656 138/98 |
| 4,976,290 A | 12/1990 | Gelin et al. | |
| 5,049,003 A | 9/1991 | Barton | |
| 5,077,107 A | 12/1991 | Kaneda et al. | |
| 5,168,006 A | 12/1992 | Inoguchi et al. | |
| 5,218,810 A | 6/1993 | Isley, Jr. | |
| 5,271,433 A | 12/1993 | Schwert et al. | |
| D343,628 S | 1/1994 | Sciholtz | |
| 5,322,653 A | 6/1994 | Muller | |
| 5,334,429 A | 8/1994 | Imoto et al. | |
| D358,599 S | 5/1995 | Dietterich et al. | |
| 5,423,630 A | 6/1995 | Imoto et al. | |
| 5,549,856 A | 8/1996 | Yokoshima | |
| 5,593,700 A | 1/1997 | Stilgenbauer | |
| 5,649,398 A | 7/1997 | Isley, Jr. et al. | |
| 5,683,530 A | 11/1997 | Fawley et al. | |
| 5,836,357 A | 11/1998 | Kittson et al. | |
| 5,868,169 A | 2/1999 | Catallo | |
| 5,931,198 A | 8/1999 | Raji et al. | |
| 5,971,030 A | 10/1999 | Maimets | |
| 6,019,136 A | 2/2000 | Walsh et al. | |
| 6,027,783 A | 2/2000 | Wagener | |
| 6,042,668 A | 3/2000 | Kamiyama et al. | |
| 6,360,780 B1 | 3/2002 | Adolphs et al. | |
| 6,369,780 B1 | 3/2002 | Adolphs et al. | |
| 6,508,276 B2 | 1/2003 | Rädlinger et al. | |
| 6,615,875 B2 | 9/2003 | Adolphs et al. | |
| 6,668,596 B1 | 12/2003 | Wagener | |
| 6,732,763 B2 | 5/2004 | Williamson et al. | |
| 6,679,966 B1 | 6/2004 | Brandenburger | |
| 7,000,645 B2 | 2/2006 | Glejbøl et al. | |
| 7,018,691 B2 | 3/2006 | McNeil | |
| 7,096,890 B2 | 8/2006 | Woolstencroft et al. | |
| 7,261,788 B1 | 8/2007 | Driver | |
| D568,347 S | 5/2008 | Manera et al. | |
| 7,478,650 B2 | 1/2009 | Pleydon et al. | |
| 7,708,033 B2 | 5/2010 | Tanaka et al. | |
| 7,727,447 B2 | 6/2010 | Song et al. | |
| 7,858,189 B2 | 12/2010 | Wagener et al. | |
| 7,891,381 B2 | 2/2011 | Anders et al. | |
| 7,938,146 B2 | 5/2011 | Brooks et al. | |
| D643,445 S | 8/2011 | Harrison | |
| 7,997,115 B2 | 8/2011 | Tidl et al. | |
| D646,700 S | 10/2011 | Takeuchi | |
| 8,047,238 B2 | 11/2011 | Wiessner et al. | |
| D658,689 S | 5/2012 | Li | |
| 8,375,972 B2 | 2/2013 | Kiest, Jr. | |
| 8,590,575 B2 | 11/2013 | D'Hulster | |
| D696,317 S | 12/2013 | Carper | |
| 8,616,243 B2 | 12/2013 | Kiest, Jr. | |
| D700,224 S | 2/2014 | Kmoch et al. | |
| 8,978,708 B2 | 3/2015 | Brandenburger et al. | |
| D733,198 S | 6/2015 | Chappel | |
| 9,052,053 B2 | 6/2015 | Kiest | |
| 9,222,611 B2 | 12/2015 | Colasanto | |
| 9,248,605 B2 | 2/2016 | Quitter | |
| D764,554 S | 8/2016 | Charles et al. | |
| 9,435,468 B2 | 9/2016 | Graham | |
| 2002/0124898 A1 | 9/2002 | Renaud et al. | |
| 2003/0066567 A1 | 4/2003 | Manners | |
| 2003/0113489 A1 | 6/2003 | Smith | |
| 2003/0138298 A1 | 7/2003 | Mercier | |
| 2003/0217777 A1 | 11/2003 | Williamson et al. | |
| 2003/0234057 A1 | 12/2003 | Woolstencroft et al. | |
| 2004/0149341 A1 | 8/2004 | Driver | |
| 2004/0258479 A1 | 12/2004 | Manners | |
| 2005/0028880 A1 | 2/2005 | Smith | |
| 2005/0028881 A1 | 2/2005 | Smith et al. | |
| 2005/0161100 A1 | 7/2005 | Pleydon et al. | |
| 2006/0118028 A1 | 6/2006 | Schroeder | |
| 2007/0074774 A1 | 4/2007 | Chandler | |
| 2007/0267785 A1 | 11/2007 | Bellamy et al. | |
| 2008/0277012 A1 | 11/2008 | Anders et al. | |
| 2008/0277013 A1 | 11/2008 | Anders et al. | |
| 2009/0116927 A1 | 5/2009 | Keenan et al. | |
| 2009/0314409 A1 | 12/2009 | Ehsani | |
| 2010/0078118 A1 | 1/2010 | Ehsani | |
| 2010/0212803 A1 | 8/2010 | Carr et al. | |
| 2013/0019982 A1 | 1/2013 | Kobayashi | |
| 2013/0074972 A1 | 3/2013 | Fuechtjohann et al. | |
| 2013/0280477 A1 | 10/2013 | Davis et al. | |
| 2014/0034175 A1* | 2/2014 | Fyfe | F16L 55/165 138/97 |
| 2014/0116557 A1 | 5/2014 | Bichler | |
| 2014/0116566 A1 | 5/2014 | Bader et al. | |
| 2014/0356074 A1 | 12/2014 | Bureau et al. | |
| 2015/0045527 A1 | 2/2015 | Schleicher et al. | |
| 2015/0246501 A1 | 9/2015 | Den Besten et al. | |
| 2016/0033072 A1 | 2/2016 | Mersmann et al. | |

FOREIGN PATENT DOCUMENTS

| | | |
|---|---|---|
| DE | 19941669 A1 | 3/2001 |
| EP | 0510784 A1 | 10/1992 |
| EP | 2390547 A2 | 11/2001 |
| EP | 2273171 A1 | 1/2011 |
| EP | 2722157 A1 | 4/2014 |
| JP | H02219635 | 9/1990 |
| JP | H0350280 A | 3/1991 |
| JP | H03292127 A | 12/1991 |
| JP | S5262379 | 5/1997 |
| JP | 2007518608 A | 7/2007 |
| WO | 2012145422 A1 | 10/2012 |
| WO | 2013163736 A1 | 5/2013 |
| WO | 2014110544 A1 | 7/2014 |

OTHER PUBLICATIONS

Written Opinion and International Search Report of related application PCT/IB2016/052132, 15 pages, dated Jul. 25, 2016.
Fyfe Co. LLC; Tyfo(r) Web Composite using Tyfo(R) S Epoxy; (c) Copyright 2005-2012 Fyfe Co. LLC 23-12; 3 pages.
Trenchless Technology, CIPP of Leaking High-Pressure Gas Main, Oct. 2011, 4 pages.
Trenchless Technology, Trenchless Lateral Repair Keeps Oregon Landscape Untouched, Apr. 2012, 2 pages.
VECTORPLY(R) Performance Composite Reinforcements, product sheet E-LTM 3610, VECTORPLY(R) Corporation, Rev. May 3, 2011.
VECTORPLY(R) Performance Composite Reinforcements, product sheet E-BX 1200, VECTORPLY(R) Corporation, Rev. May 3, 2011.
VECTORPLY(R) Performance Composite Reinforcements, product sheet E-TLX 2400, VECTORSPORTS(TM), VECTORPLY(R) Corporation, Rev. May 3, 2011.
VECTORPLY(R) Performance Composite Reinforcements, product sheet E-QX 4800, LABORSAVER(TM), VECTORPLY(R) Corporation, Rev. May 3, 2011.
VECTORPLY(R) Performance Composite Reinforcements, product sheet E-LM 3610, LABORSAVER(TM), VECTORPLY(R) Corporation, Rev. May 3, 2011.
VECTORPLY(R) Performance Composite Reinforcements, product sheet E-TLX 2200, VECTORSPORTS(TM), VECTORPLY(R) Corporation, Rev. May 3, 2011.

(56) References Cited

OTHER PUBLICATIONS

VECTORPLY(R) Performance Composite Reinforcements, product sheet E-BXM 1708, VECTORPLY(R) Corporation, Rev. May 3, 2011.
VECTORPLY(R) Performance Composite Reinforcements, product sheet E-BX 1700, VECTORPLY(R) Corporation, Rev. May 3, 2011.
VECTORPLY(R) Performance Composite Reinforcements, product sheet E-QXCFM 3510, VECTORFUSION(TM) Infusion Specific Reinforcements, VECTORPLY(R) Corporation, Rev. May 3, 2011.
VECTORPLY(R) Performance Composite Reinforcements, product sheet E-BXCFM 1710, VECTORFUSION(TM), Infustion-Specific Reinforcements, VECTORPLY(R) Corporation, Rev. May 3, 2011.
Rongxing Zhou, An Improved MWK Structure for Composite Reinforcement, Textile Research Journal, Published by Sage, Apr. 1, 2005.
FYFE(R) an Aegion Company, Tyfo(R) Fibrwrap(R) Composite Systems, 3 pages, Copyright 2013 Fyfe Co., LLC (admitted prior art).
Pipelines 2014: From Underground to the Forefront of Innovation and Sustainability; Fifteen Years of Lessons Learned . . . ; (C) ASCE 2014, 14 pages.

* cited by examiner

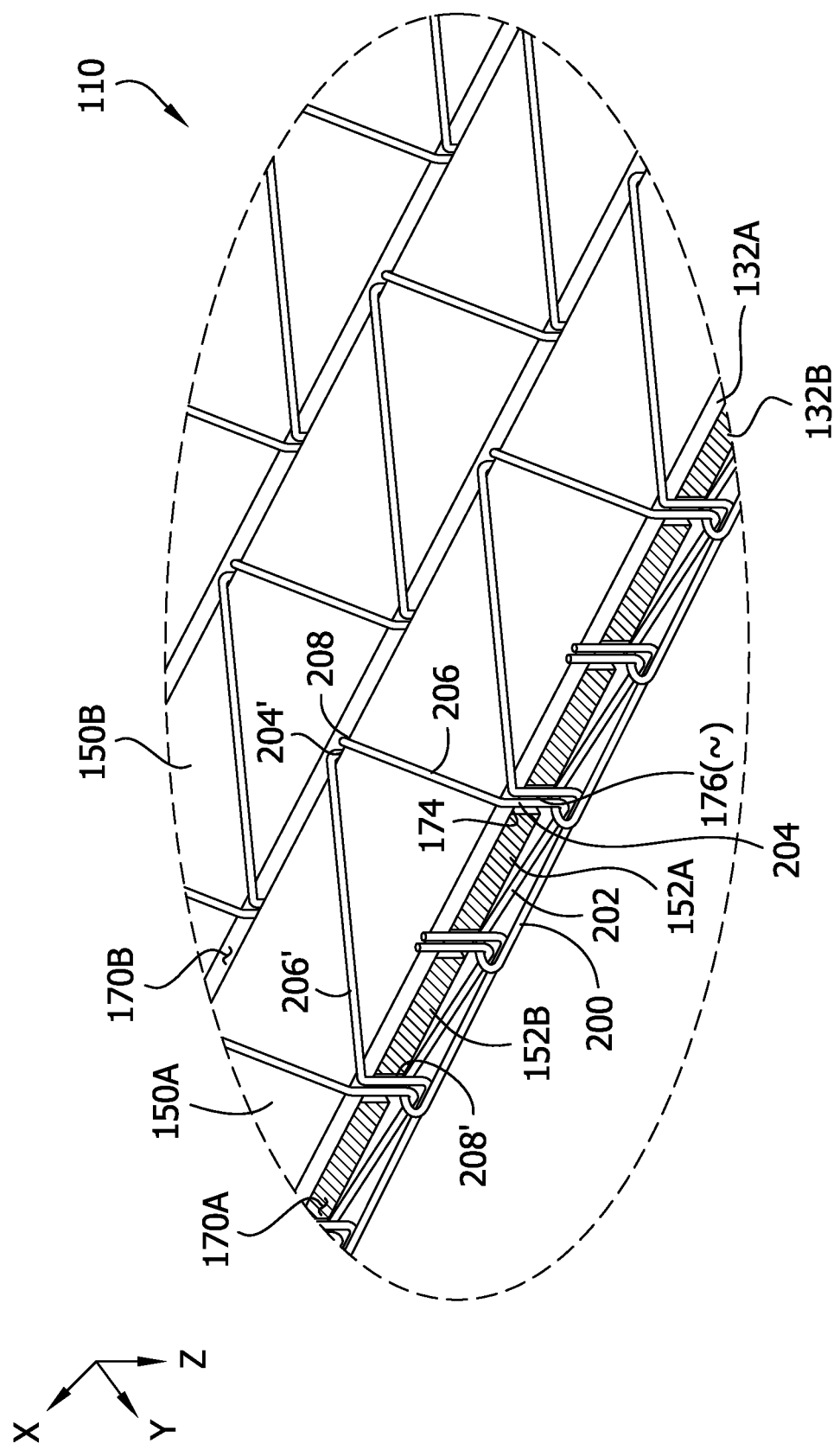

STRUCTURAL FABRIC USEFUL FOR LINING PIPE

FIELD OF THE DISCLOSURE

The present invention generally relates to a structural fabric capable of holding pressure when used to line a pipe.

BACKGROUND OF THE DISCLOSURE

Over time or because of a particular event or condition (e.g., seismic activity, exposure to excessive or uneven loads or moments, poor compaction, crown corrosion, corrosive soil, etc.), the structural integrity or capacity of force mains, other pipes, and like structures may diminish. For example, such items may crack, corrode, deteriorate, and the like. Such damage to a pipe is particularly problematic when the pipe is used to carry a high pressure fluid because the pressurized fluid can impart significant forces, particularly in the hoop direction, on the pipe. Different methods of repairing or otherwise strengthening damaged pipes and other items are known. For example, fabric liners can be attached to one or more portions of a pipe interior. In cured-in-place pipe lining applications, such liners are impregnated in a curable resin or epoxy, attached to the interior surface of a host pipe, and allowed to cure, thereby forming a watertight barrier between the host pipe and the pipe interior.

Attempts have been made to leverage the high strength and elastic modulus of carbon fibers in cured-in-place pipe lining applications. In particular, bundles of carbon fibers have been woven into fabrics capable of carrying a curable resin or epoxy. However, after carbon fiber fabrics are impregnated with curable resin or epoxy and cured, the cured resin or epoxy tends to eventually separate near gaps between adjacent bundles of carbon fibers. This creates pinhole leaks that permit the fluid contained in the pipe to escape or permit groundwater or the like to enter the pipe. Such pinhole leaks are particularly problematic in high pressure applications where the fluid contained in the pipe has a high positive pressure. A liner for lining pipes that has the high strength and elastic modulus of carbon fiber fabric, while providing a watertight barrier between a host pipe and interior lumen is desired. It is also desired for the liner to effectively limit the transmission of forces, particularly in the hoop direction, to the host pipe caused by the presence of a pressurized fluid in the pipe interior, while at the same time minimizing manufacturing costs.

SUMMARY OF THE DISCLOSURE

A liner for lining an interior surface of a host pipe at least between two access points of the host pipe separated by a distance comprises first and second ends and a length extending from the first end to the second end. The length of the liner is at least as long as the distance between the access points of the host pipe to cover an interior surface of the host pipe in the longitudinal direction from one of the two access points to the other of the two access points when the liner is applied to the interior surface of the host pipe. The liner further has first and second longitudinal edges and a width extending from the first longitudinal edge to the second longitudinal edge. The width of the liner is at least as long as an interior hoop dimension of the host pipe to cover the interior surface of the host pipe in the hoop direction when the liner is applied to the interior surface of the host pipe. The liner comprises a plurality of lengthwise oriented bundles of strengthening fibers extending from the first end to the second end of the liner and a plurality of widthwise oriented bundles of strengthening fibers extending transverse to the lengthwise oriented bundles from the first longitudinal edge to the second longitudinal edge of the liner. The lengthwise oriented bundles and widthwise oriented bundles are connected to each other to form a unitary liner configured to be folded about an axis extending lengthwise of the liner so that a longitudinal edge margin at the first longitudinal edge overlies a longitudinal edge margin at the second longitudinal edge into a shape for insertion into the host pipe. The weight per unit area of the liner of the widthwise oriented bundles of strengthening fibers is at least about two and a half-times as much as the weight per unit area of the liner of the lengthwise oriented bundles of strengthening fibers.

A lined pipe comprises a host pipe comprising a wall extending a longitudinal dimension in a longitudinal direction and a hoop dimension in a hoop direction. The wall of the host pipe has an interior surface and surrounds a lumen extending in the longitudinal direction through the lined pipe in the hoop direction. The host pipe has a first access point to the lumen and a second access point to the lumen. The first and second access points are separated by a distance. A composite liner lines the inner surface of the host pipe wall at least from the first access point to the second access point. The liner comprises first and second ends and a length extending from the first end to the second end. The length of the liner is at least as long as the distance between the access points of the host pipe to cover the interior surface of the host pipe in the longitudinal direction from one of the two access points to the other of the two access points. The liner further has first and second longitudinal edges and a width extending from the first longitudinal edge to the second longitudinal edge. The width of the liner is at least as long as an interior hoop dimension of the host pipe and covers the interior surface of the host pipe in the hoop direction. The liner comprises a plurality of lengthwise oriented bundles of strengthening fibers extending from the first end to the second end of the liner and a plurality of widthwise oriented bundles of strengthening fibers extending transverse to the lengthwise oriented bundles from the first longitudinal edge to the second longitudinal edge of the liner. The lengthwise oriented bundles and widthwise oriented bundles are connected to each other to form a unitary liner configured in a tubular shape with a longitudinal edge margin at the first longitudinal edge overlying a longitudinal edge margin of the second longitudinal edge. The weight per unit area of the liner of the widthwise oriented bundles of strengthening fibers is at least about two and a half-times as much as the weight per unit area of the liner of the lengthwise oriented bundles of strengthening fibers.

A liner for lining an interior surface of a host pipe at least between two access points of the host pipe separated by a distance includes first and second ends and a length extending from the first end to the second end. The length of the liner is at least as long as the distance between the access points of the host pipe to cover an interior surface of the host pipe in the longitudinal direction from one of the two access points to the other of the two access points when the liner is applied to the interior surface of the host pipe. The liner further has first and second longitudinal edges and a width extending from the first longitudinal edge to the second longitudinal edge. The width of the liner is at least as long as an interior hoop dimension of the host pipe to cover the interior surface of the host pipe in the hoop direction when the liner is applied to the interior surface of the host pipe.

The liner comprises a strengthening layer including bundles of strengthening fiber extending lengthwise of the liner and bundles of strengthening fiber extending widthwise of the liner. A watertight layer comprises fibers spanning substantially continuously the length and the width of the liner. The fibers are arranged to be impregnated with a curable polymer and to provide a watertight barrier when the watertight layer is impregnated with the curable polymer, applied to the interior surface of the pipe, and cured. The watertight layer is laminated to the strengthening layer.

A lined pipe comprises a host pipe having a length, a circumference, a wall including an interior surface defining an interior lumen, and at least two access points separated by a distance. A tubular composite liner lines the host pipe on the interior surface of the host pipe at least between the two access points. The tubular composite liner has opposite first and second ends and opposite longitudinal edges. The composite liner comprises a strengthening layer including bundles of strengthening fiber extending along the length of the host pipe and bundles of strengthening fiber extending along the circumference of the host pipe. A watertight layer comprises fibers spanning substantially continuously the length and the width of the liner. The fibers in the watertight layer are impregnated with a cured polymer and provide a watertight barrier. The watertight layer is laminated to the strengthening layer.

Other objects and features will be in part apparent and in part pointed out hereinafter.

BRIEF DESCRIPTION OF THE DRAWINGS

FIG. 4C is an enlarged fragmentary, bottom cross-sectional, schematic perspective of the first and second carbon sublayers illustrating additional details of the tricot stitch;

Corresponding reference characters indicate corresponding parts throughout the drawings.

DETAILED DESCRIPTION

Figure 1:
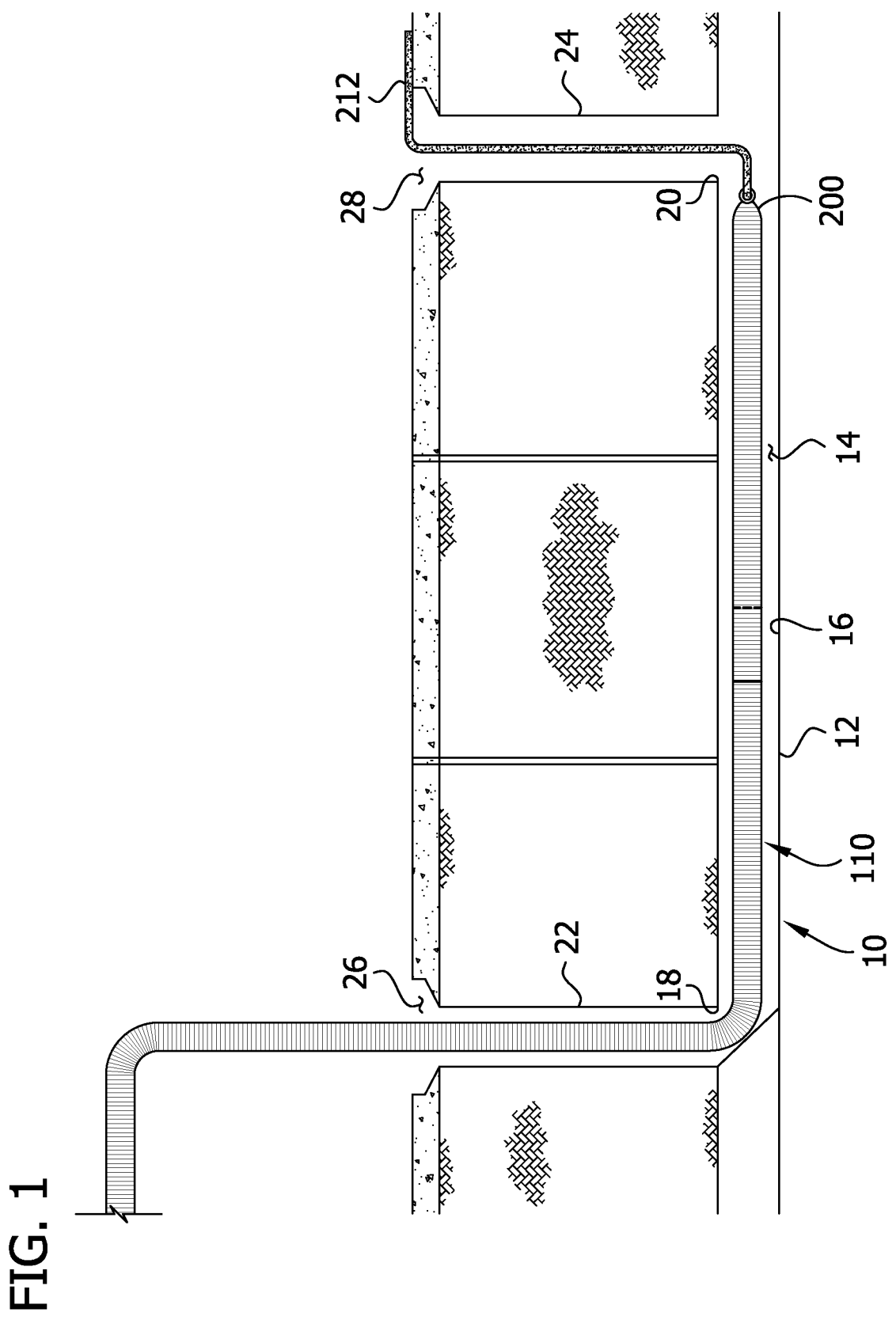
FIG. 1 illustrates a schematic of a liner being pulled into a host pipe buried underground.

Referring to FIG. 1, a host pipe in need of structural reinforcement is generally indicated at reference number 10.

In the illustrated embodiment, the host pipe 10 is an underground force main configured to carry a high pressure fluid. Although the illustrated host pipe 10 is an underground force main, it will be understood that other pipes and other structures can be reinforced using the teachings of this disclosure without departing from the scope of the invention. The host pipe 10 has a wall 12 extending in a hoop direction around an interior lumen 14, which in use is filled with the high pressure fluid. In the illustrated embodiment, the wall 12 has deteriorated such that it is unfit to carry the high pressure fluid and, accordingly, is in need of structural reinforcement. An interior surface 16 of the wall 12 bounds the interior lumen 14 before the host pipe 10 is provided with structural reinforcement.

The wall 12 extends in a longitudinal direction between two access points 18, 20 separated by a distance. The access points 18, 20 are connected to access tubes 22, 24 extending up from the underground host pipe 10 to manhole openings 26, 28 in the surface of the ground. The manhole openings 26, 28 and access tubes 22, 24 can be used to access the host pipe 10 at the access points 18, 20. A liner, generally indicated at reference number 110, can be pulled through either of the access tubes 22, 24 into the host pipe 10 where it is applied to the interior surface 16 of the pipe wall 12. The liner 110 is constructed to provide high-strength reinforcement of the host pipe 10 and to provide a watertight barrier between the interior lumen 14 and the host pipe wall 112. FIG. 1 is exemplary only, as the host pipe 10 may be accessed and the liner 110 installed in other ways.

Figure 2:
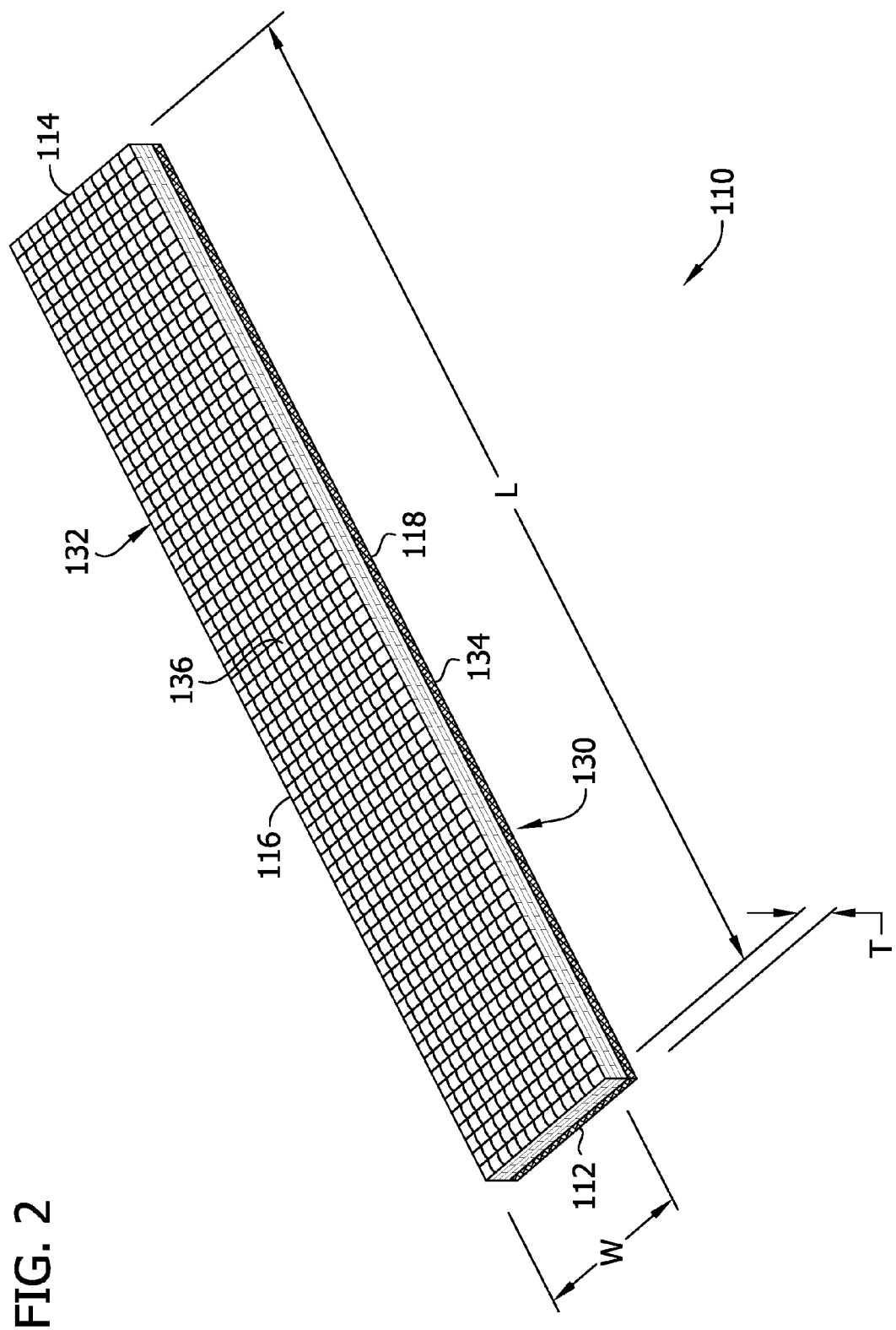
FIG. 2 is a perspective of structural fabric used to form the liner.
Figure 8:
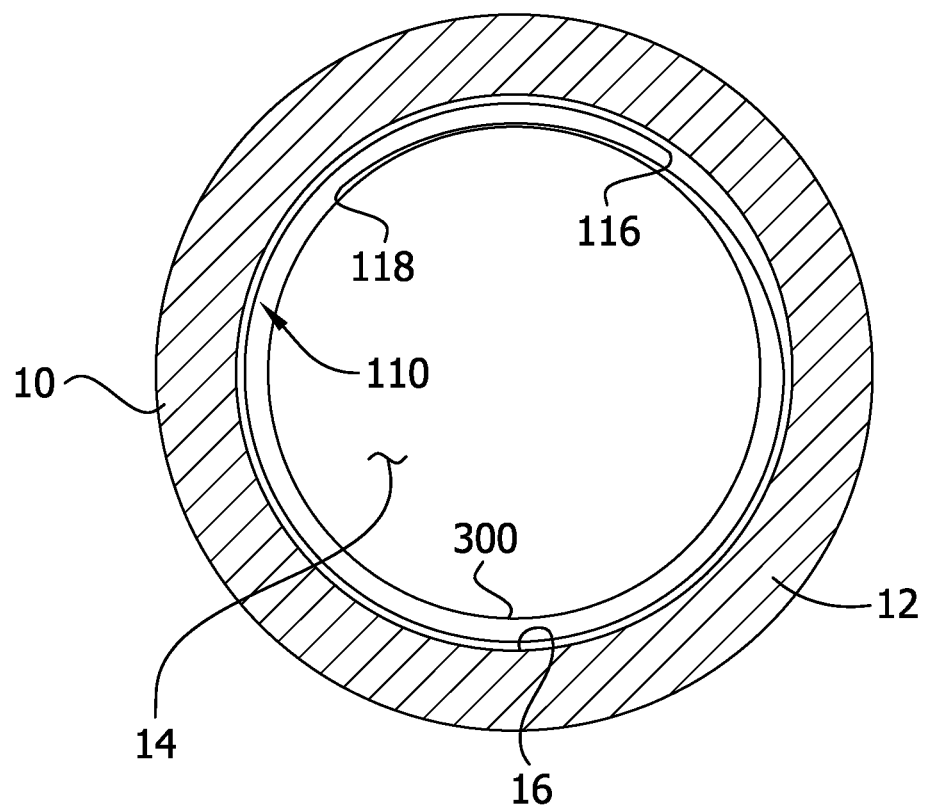
FIG. 8 is a cross-sectional schematic of the liner and carrier tube installed in the host pipe.

Referring to FIG. 2, the liner 110 comprises a multi-layered sheet of structural fabric sized and shaped to cover the interior surface 16 of the host pipe 10 between the two access points 18, 20. The liner 110 has opposite first and second ends 112, 114 and a length L extending between the first and second ends. The length L of the liner 110 is preferably at least as long as the distance between the two access points 18, 20 of the host pipe 10 so that, when the liner is applied to the interior surface of the host pipe, the liner covers the entire interior surface 16 of the host pipe in the longitudinal direction from one of the two access points to the other of the two access points. The liner 110 also has opposite first and second longitudinal edges 116, 118 and a width W extending from the first longitudinal edge to the second longitudinal edge. The width W of the liner 110 is preferably at least as long as the interior hoop dimension of the host pipe 10 so that, when the liner is applied to the interior surface 16 of the host pipe, the liner covers the entire interior surface 16 of the host pipe in the hoop direction. In a preferred embodiment, the width W of the liner 110 is longer than the interior hoop dimension of the host pipe 10 so that, when the liner is applied to the interior surface 16, an edge margin of the liner adjacent the first longitudinal edge 116 overlies an edge margin of the liner adjacent the second longitudinal edge 118 within the pipe (FIG. 8).

Figure 3:
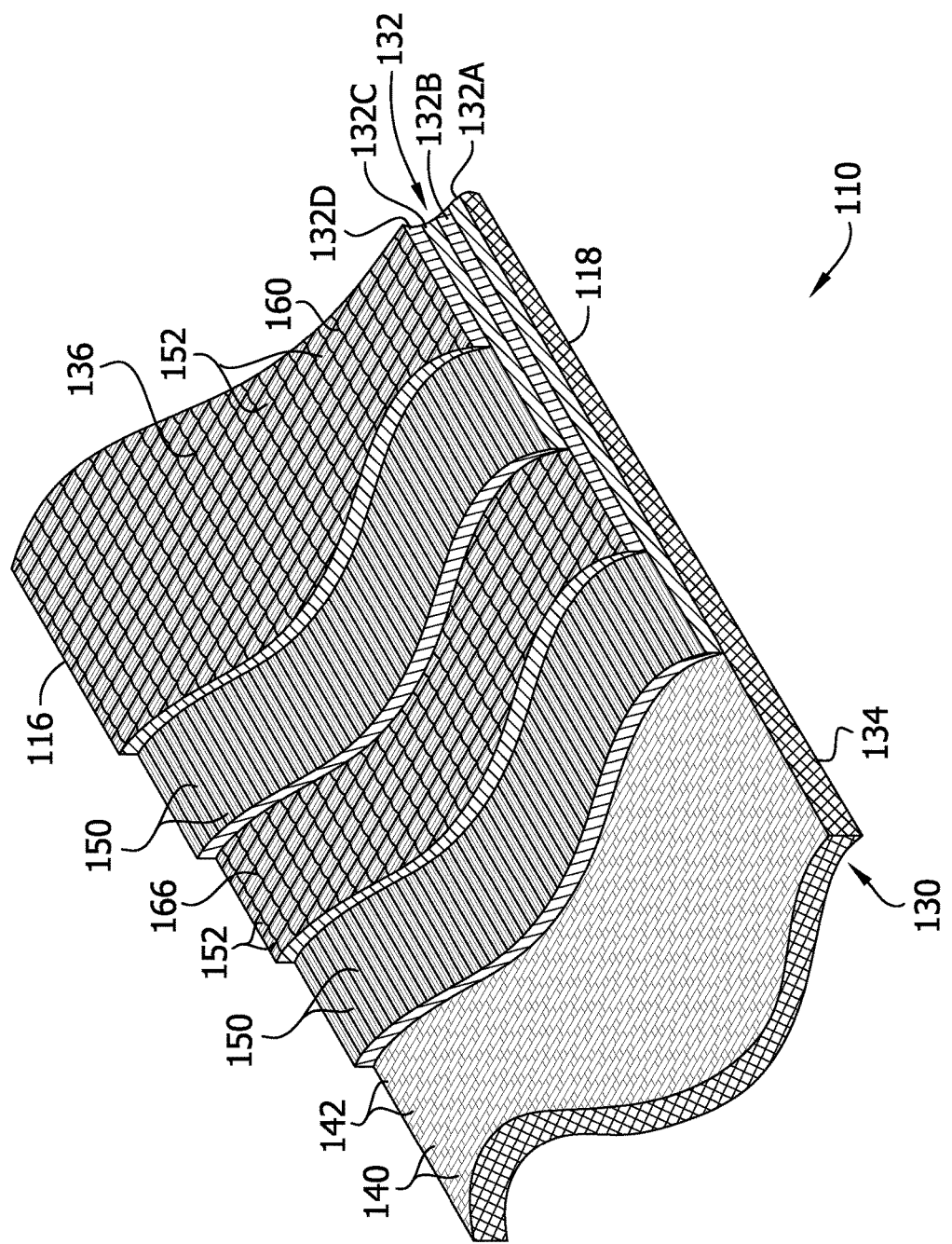
FIG. 3 is an enlarged fragmentary perspective of the structural fabric with parts broken away to illustrate the layers and sublayers of the structural fabric.

Referring to FIG. 3, the liner 110 has a multi-layered architecture including a watertight layer, generally indicated at reference number 130, and a strengthening layer, generally indicated at reference number 132. The liner 110 is configured to be impregnated with a curable polymeric material. When the liner is impregnated with a curable polymeric material, applied to the surface of a structure, and cured, the watertight layer 130 forms a watertight barrier at the surface of the structure. The strengthening layer 132 strengthens the structure to which the liner 110 has been applied. Moreover, after the curable polymeric material in the liner 110 has cured, the strengthening layer may function as a "substitute structure" for the original structure, in that the underlying structure may have weakened to the point that the strengthening layer provides substantially all of the strength of the resulting lined structure.

In the illustrated embodiment, the watertight layer 130 comprises glass fibers that span substantially continuously the length L of the liner 110 and glass fibers that span substantially the width W of the liner. It will be understood that fibers other than glass fibers may be used to form the watertight layer. For example, the watertight layer may comprise carbon fibers, basalt fibers, aramid fibers, ultra-high molecular weight polyethylene fibers, or other, preferably non-conductive fibers, without departing from the scope of the invention.

The illustrated strengthening layer 132 comprises carbon fibers that span substantially continuously the length L of the liner 110 and carbon fibers that span substantially the width W of the liner. It will be understood that strengthening fibers other than carbon fibers may be used to form the strengthening layer. For example, the strengthening layer 132 may comprise glass fibers, basalt fibers, boron fibers, aramid fibers, ultra-high molecular weight polyethylene fibers, or other high strength fibers, without departing from the scope of the invention. Preferably, the fibers used to from the strengthening layer 132 have a tensile strength of greater than or equal to about 0.35 Msi (about 2.4 GPa). Likewise the fibers used to form the strengthening layer 132 preferably have a tensile modulus of greater than or equal to about 8.7 Msi (about 60 GPa). In addition, the fibers used to form the strengthening layer have a percentage of elongation at breakage of greater than or equal to about 1%.

Although it is understood that the strengthening layer 132 may comprise strengthening fibers other than carbon fibers and the watertight layer 130 may comprise fibers other than glass fibers, the illustrated strengthening layer will be referred to as a "carbon layer" and the illustrated watertight layer will be referred to as a "glass layer."

The carbon layer 132 is laminated to the glass layer 130 to form a unitary composite fabric. Preferably, the laminated liner 110 is constructed to be foldable along a lengthwise axis so that the liner can be folded into a folded configuration suitable for being pulled into the host pipe 10 as discussed in further detail below. When the liner 110 is applied to the interior surface 14 of the host pipe 10, the glass layer 130 provides a watertight barrier between the host pipe wall 12 and the interior lumen 16, and the carbon layer 132 provides structural reinforcement of the host pipe that inhibits the transmission of forces (particularly in the hoop direction) induced by a pressurized fluid in the interior lumen to the host pipe wall.

The liner 110 is constructed to be relatively thin so that the size and shape of the interior lumen 14 of the host pipe 10 is minimally altered by the liner being applied to the interior surface 16. The glass layer 130 defines an outer surface 134 of the liner 110 configured to contact the interior surface 16 of the host pipe 10 when the liner is applied to the interior surface of the host pipe. The carbon layer 132 defines an inner surface 136 of the liner 110 configured to bound the interior lumen 14 of the host pipe 10 when the liner is applied to the interior surface 16 of the host pipe. As shown in FIG. 2, a thickness T of the liner 110 extends between the outer surface 134 and the inner surface. Preferably, the thickness T of the liner 110 is less than about 0.1 inches (about 2.54 mm). In the illustrated embodiment, the thickness T is about 0.075 inches (about 1.905 mm). Other thicknesses can also be used without departing from the scope of the invention.

Referring again to FIG. 3, the glass layer 130 includes glass fibers bundled together to form a plurality of warp bundles of glass fibers 140 (broadly, "first bundles of glass fibers"). The glass layer 130 also includes additional glass fibers bundled together to form a plurality of weft bundles of glass fibers 142 extending transverse to the warp bundles. The warp bundles of glass fibers 140 and weft bundles of glass fibers 142 are woven together to form a single woven layer of glass fabric. The warp bundles of glass fibers 140 extend substantially lengthwise of the liner 110 (i.e., the warp bundles are oriented at about 0°) and the weft bundles of glass fibers 142 extend substantially perpendicular to the warp bundles, substantially widthwise of the liner (i.e., the weft bundles are oriented at about 90°). The warp and weft bundles of glass fibers could be arranged differently (e.g., the warp bundles could be oriented at about +45° and the weft bundles could be oriented at about −45°) without departing from the scope of the invention.

The glass layer 130 is a watertight layer that provides a watertight barrier when impregnated with cured polymer. The glass layer is configured to provide a watertight barrier between the host pipe wall 12 and the interior lumen 14 when the liner 110 is applied to the interior surface 16 of the host pipe 10. In addition, the glass layer 130 electrically insulates the carbon fiber layer 132 from the host pipe 10. The glass layer 130 is configured to carry (e.g., be impregnated with) a curable polymeric material such as epoxy. As discussed in further detail below, in use a curable polymeric material is applied to the glass layer 130 and the glass layer is applied to the interior surface 16 of the host pipe 10, where the curable material cures and binds the glass layer to the interior surface of the host pipe. After curing, the glass layer 130 is suspended in a solid matrix of polymeric material, and together, the glass layer and polymeric material form the watertight barrier between the host pipe wall 12 and the interior lumen 14. In one or more embodiments, when the liner 110 is applied to the interior surface 16 of the host pipe 10 the glass layer 130 and polymeric material are watertight up to an internal fluid pressure within the interior lumen 14 of at least about 600 pounds per square inch gauge pressure ("psig") (about 4.14 MPa).

To provide a watertight barrier, preferably either of the warp bundles of glass fibers 140 or the weft bundles of glass fibers 142 float over at least two adjacent bundles of the other of the warp bundles and weft bundles. Preferably, the weave is not a plain weave. For example, in one or more embodiments, the warp bundles of glass fibers 140 and weft bundles of glass fibers 142 are woven in either a satin weave or a twill weave. It is believed that, as compared with a plain weave or non-woven fabric architecture, glass fabrics comprising either satin or twill weaves have enhanced fluid barrier characteristics. Satin and twill weaves have fewer inherent openings between adjacent fiber bundles, where the cured polymeric material is prone to separate and form pinholes. In the illustrated embodiment, the glass layer 130 comprises a symmetrical satin weave in which the weft bundles 142 float three adjacent warp bundles 140. However, other weaves can also be used without departing from the scope of the invention. If materials other than glass fibers are used to form a watertight layer, the fibers will still preferably be woven in either a satin weave or a twill weave.

Because the carbon layer 132 is designed to provide suitable structural reinforcement of the host pipe 10, the glass layer 130 need not be designed to substantially improve the strength of the host pipe. Accordingly, in the illustrated embodiment, the glass layer 130 is constructed to minimize manufacturing costs while achieving the desired water tightness when the liner 110 is applied to the interior surface 16 of the host pipe 10. To simplify manufacturing and thereby minimize manufacturing costs, each of the warp bundles of glass fibers 140 and weft bundles of glass fibers 142 includes about the same number of glass fibers, has about the same cross-sectional dimensions, and has about the same weight per unit area. In one embodiment, the glass layer 130 is a woven glass fabric such as Tyfo® WEB, a satin woven glass fabric in which each weft bundle 142 floats over three adjacent warp bundles 140. Tyfo® WEB is available from Fyfe Company of San Diego, Calif. Other glass fabrics may also be used without departing from the scope of the invention.

The carbon layer 132 of the multi-layered composite fabric liner 110 comprises a plurality of separately attached sublayers of carbon fibers 132A-132D. More specifically, the illustrated carbon layer 132 includes a first carbon sublayer 132A adjacent the glass sublayer 130, a second carbon sublayer 132B adjacent the first carbon sublayer, a third carbon sublayer 132C adjacent the second carbon sublayer, and a fourth carbon sublayer 132D adjacent the third carbon sublayer and defining the inner surface 136 of the liner 110. Although the illustrated embodiment uses four separately attached carbon sublayers 132A-132D, it will be understood that other numbers of carbon sublayers (e.g., one or more) can also be used without departing from the scope of the invention. For example, it is particularly contemplated that the carbon layer 132 could include only the first and second carbon sublayers 132A, 132B, and omit the third and fourth carbon sublayers 132C, 132D, without departing from the scope of the invention. It is also contemplated that layers 132A-132D could be rearranged without departing from the scope of the invention.

Each of the first and third carbon sublayers 132A and 132C comprises carbon fibers arranged in lengthwise-oriented bundles of carbon fibers 150, and each of the second and fourth carbon sublayers 132B, 132D comprises carbon fibers arranged in widthwise oriented bundles of carbon fibers 152. In a suitable embodiment, the carbon fibers forming the lengthwise and widthwise oriented bundles of carbon fibers 150, 152 are Panex® 35 carbon fibers, sold by Zoltek of St. Louis, Mo. Other types of carbon fibers may also be used. Each of the lengthwise oriented bundles of carbon fibers 150 extends from the first end 112 to the second end 114 of the liner 110. Within each sublayer 132A, 132C, the lengthwise oriented bundles of carbon fibers are arranged in side-by-side engagement and 150 span substantially continuously the width W of the liner 110 from the first longitudinal edge 116 to the second longitudinal edge 118. Each of the widthwise oriented bundles of carbon fibers 152 extends transverse (e.g., about perpendicular) to the lengthwise oriented bundles of carbon fibers 150, from the first longitudinal edge 116 to the second longitudinal edge 118 of the liner 110. Within each sublayer 132B, 132D, the widthwise oriented bundles of carbon fiber 152 are arranged in side-by-side engagement with one another and span substantially continuously the length L of the liner 110.

Unlike the glass layer 130, the sublayers 132A-132D of the carbon layer 132 are not woven sheets of fabric. However, in some embodiments, woven bundles of carbon fibers may be used without departing from the scope of the invention. In the illustrated embodiment, carbon fibers in each of the sublayers 132A-132D consist of only the carbon fibers in the respective set of the lengthwise oriented carbon fiber bundles 150 and widthwise oriented bundles of carbon fibers 152. The first and third sublayers 132A, 132C are stacked atop the glass layer 130 such that their respective lengthwise oriented carbon fiber bundles 150 are positionally aligned between the longitudinal edges 116, 118 of the liner (e.g., a fourth bundle 150 over from the first longitudinal edge 116 in the first sublayer 132A is spaced apart from the first longitudinal edge the same distance as a fourth bundle over from the first longitudinal edge in the third sublayer 132C). Likewise, the second and fourth sublayers 132B, 132D are stacked atop the glass layer 130 such that their respective widthwise oriented carbon fiber bundles 152 are positionally aligned between the two ends 112, 114 of the liner 110 (e.g., a fourth bundle 152 over from the first end 112 in the second sublayer 132B is spaced apart from the first end the same distance as a fourth bundle over from the first end in the fourth sublayer 132D). No carbon fibers are present in any of the sublayers 132A-132D which extend transverse to the other carbon fiber bundles in that sublayer. Thus, the carbon fiber bundles 150, 152 in each of the sublayers 132A-132D extend in a substantially straight direction without being bent over and under transverse fibers to form a weave (e.g., the carbon layers form a non-crimp fabric). The bending or crimping of fibers in a woven fabric typically reduces the tensile modulus and strength of the liner. By using non-woven carbon fiber bundles 150, 152 instead of woven fiber bundles, the tensile modulus and strength of the liner can be maximized while minimizing the amount of carbon fibers used, thereby reducing manufacturing cost.

The lengthwise and widthwise oriented bundles of carbon fiber 150, 152 are connected to each other to form the unitary liner 110. To secure the unwoven carbon fiber bundles 150, 152 in each of the sublayers 132A-132D to the liner 110, the carbon layer 132 is laminated to the glass layer 130. Any suitable lamination technique (e.g., adhesive bonding, etc.) may be used, but in the illustrated embodiment, the carbon sublayers 132A-132D are stitched to the glass layer 130. One or more threads 160 extend back and forth through the glass layer 130 and each of the carbon sublayers 132A-132D to form a pillar stitch that extends from the outer surface 134 to the inner surface 136 of the liner 110.

Figure 4A:
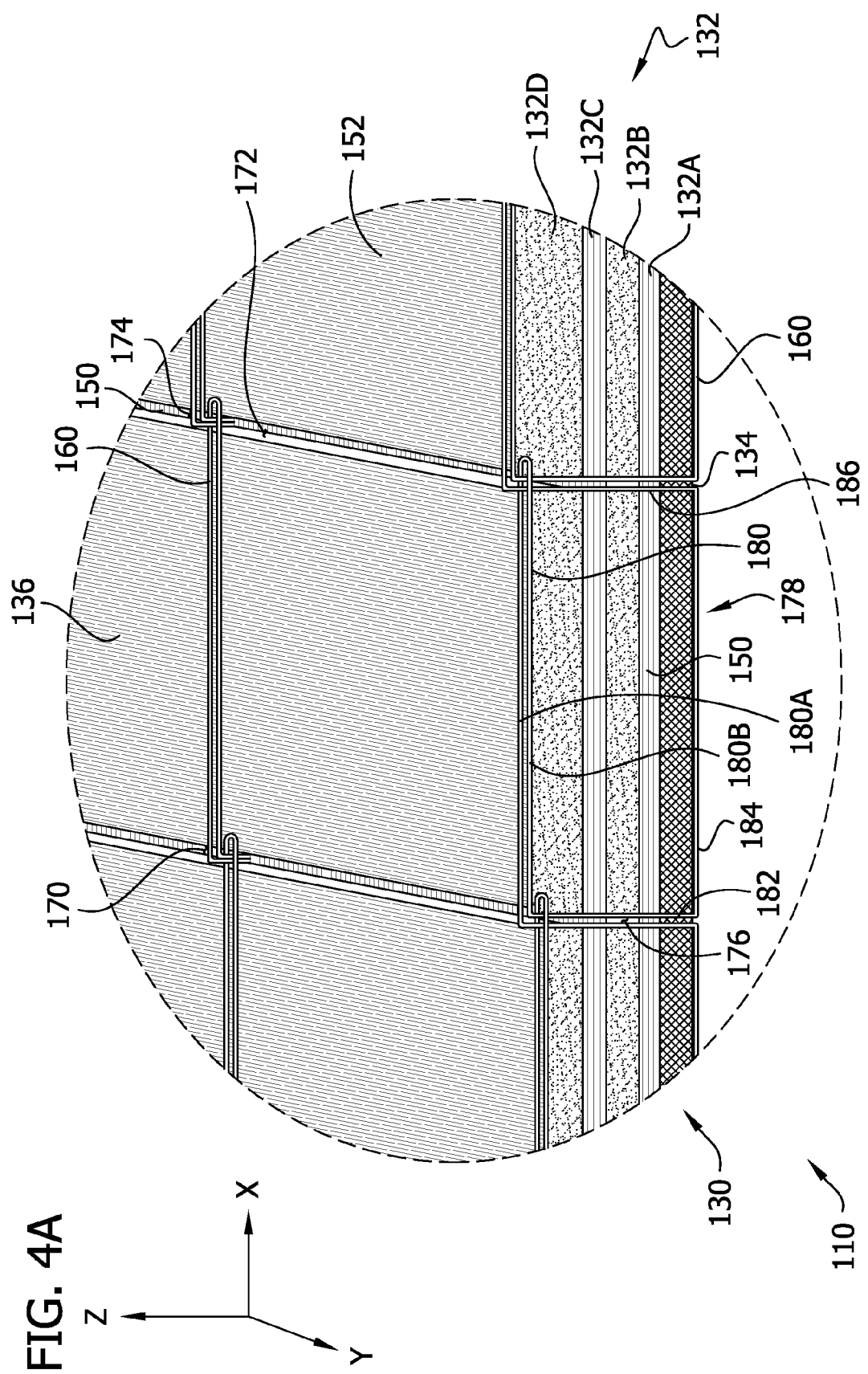
FIG. 4A is an enlarged fragmentary, cross-sectional, schematic perspective of the structural fabric illustrating details of a pillar stitch binding a carbon layer to a glass layer of the structural fabric.

As shown in FIG. 4A, each of the threads 160 extends along a pillar (chain) stitch pattern from the outer surface 134 of the glass layer 130 to the inner surface 136 of the carbon layer 132. In one embodiment, the threads 160 comprise polyester textured filament yarn, but other types of threads may also be used without departing from the scope of the invention. In reference to the coordinate system illustrated in FIG. 4A, lengthwise oriented bundles of carbon fibers 150 extend generally in the x-direction, widthwise oriented bundles 152 extend generally in the y-direction, and the carbon sublayers 132A-132D are stacked atop the glass layer 130 generally in the z-direction. Lengthwise oriented seams 170 (see also FIG. 4C) separate adjacent lengthwise oriented bundles 150 (the size of the seam is exaggerated for effect in FIG. 4A-4C). Widthwise oriented seams 172 separate widthwise oriented bundles 152. The lengthwise oriented seams 170 formed between the lengthwise oriented bundles 150 of the first carbon sublayer 132A intersect the widthwise oriented seams 172 of the widthwise oriented bundles 152 of the second carbon sublayer 132B at seam intersections 174. Likewise, the lengthwise oriented seams 170 formed between the lengthwise oriented bundles 150 of the third carbon sublayer 132C intersect the widthwise oriented seams 172 of the widthwise oriented bundles 152 of the fourth carbon sublayer 132D at seam intersections 174. The lengthwise oriented bundles 150 and lengthwise oriented seams 170 of the first and third sublayers 150A, 150C are positionally aligned in two spaced apart planes that are generally parallel to the x-y plane. Likewise, the widthwise oriented bundles 152 and widthwise oriented seams 172 of the second and fourth sublayers 150A, 150C are positionally aligned in two spaced apart planes that are generally parallel to the x-y plane. Accordingly, the seam intersections 174 formed between the seams 170, 172 in the first and second carbon sublayers 132A-132B and the seam intersections formed between the seams 170, 172 in the third and fourth carbon sublayers 132C-132D are positionally aligned in two spaced apart planes that are parallel to the x-y plane. The aligned seam intersections 174 form vertical thread passages 176 extending generally in the z-direction through the carbon sublayers 132A-132D. Although FIG. 4A illustrates the seams 170, 172 and thread passages 176 as gaps, it will be understood that the seams and thread passages will preferably be formed between carbon fiber bundles 150, 152 arranged in abutting side-by-side engagement with one another and with the portions of the threads 160 extending in the z-direction.

Each individual thread 160 extends through the glass and carbon layers 130, 132 generally in a plane parallel to the x-z plane that is a aligned with a respective aligned pair of the lengthwise oriented seams 170 (i.e., a seam 170 between bundles 150 in the first sublayer 132A and a positionally aligned seam between bundles in the third sublayer 132C). The thread 160 forms a chain of loops 178 extending lengthwise of the liner 110. Each of the individual loops 178 girds a widthwise oriented carbon fiber bundle 152 in the fourth carbon sublayer 132D and a positionally aligned widthwise oriented carbon fiber bundle in the second carbon sublayer 132B to the glass layer 130. The entire chain of loops 178 formed by the thread 160 delineates the seam 170 between adjacent lengthwise oriented bundles 150 in the first carbon sublayer 132A and a positionally aligned pair of adjacent lengthwise oriented bundles in the third carbon sublayer 132C.

Each individual loop 178 is formed in part by a looped portion 180 that extends along the inner surface 136 of a respective widthwise oriented carbon fiber bundle 152 of the fourth carbon sublayer 132D. The looped portion 180 has open and closed ends. A first leg 180A of the looped portion 180 extends generally in the x-direction from the open end of the looped portion, and a second leg 180B extends generally in the negative x-direction from the closed end of the looped portion. The first leg 180A is connected to the second leg 180B at the closed end of the looped portion 180. The second leg 180B of the looped portion 180 is connected to a first vertical leg 182, which extends from the second leg of the looped portion generally in the negative z-direction through a thread passage 176. It will be understood that the thread passage 176 need not provide clearance for the first vertical leg 182 and merely functions as a path along which the first vertical leg of the thread 160 extends through the carbon sublayers 132A-132D. The first vertical leg 182 extends through the closed end of the looped portion 180 of an adjacent one of the loops 178 (i.e., a loop at left in FIG. 4A). The first vertical leg 182 extends vertically through lengthwise and widthwise oriented seams 170, 172 and thereby separates adjacent lengthwise and widthwise oriented bundles 150, 152 at the thread passage 176. The first vertical leg 182 extends further through the glass layer 130 before connecting to an outer horizontal leg 184. The horizontal leg 184 extends from the first vertical leg 182 generally in the x-direction along the outer surface 134 of the glass layer 130. A second vertical leg 186 extends from the horizontal leg generally in the z-direction through the glass layer 130. The second vertical leg 186 extends further through a respective thread passage 176 and is connected to the first looped portion leg 180A of another loop 178. Before the thread 160 turns horizontally toward the connected first looped portion leg 180A of the other loop 178, the second vertical leg 186 of the loop extends through the closed end of its own looped portion 180.

Each loop 178 separates respective bundles 150, 152 of the carbon sublayers 132A-132D from adjacent bundles. The loops 178 gird the widthwise oriented bundles 152 to the glass layer 130, which functions, in part, as a backing that supports the carbon sublayers 132A-132D. The girded widthwise oriented bundles 152 press against the lengthwise oriented bundles 150 to likewise secure the lengthwise oriented in position against the glass layer 130.

Figure 4B:
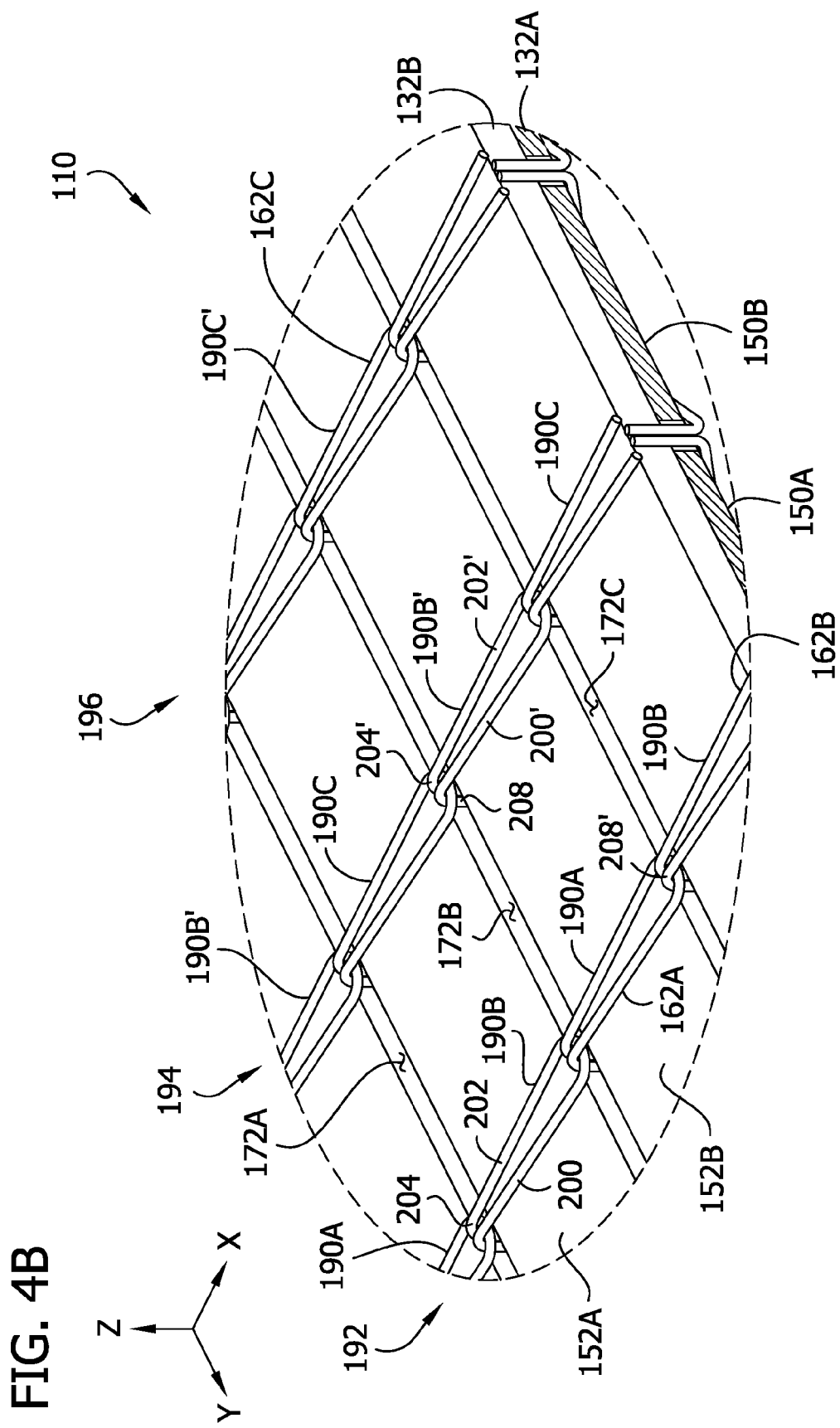
FIG. 4B is an enlarged fragmentary, top cross-sectional, schematic perspective of first and second carbon sublayers of the structural fabric illustrating details of a tricot stitch binding the first and second carbon sublayers together in the structural fabric.

As shown in FIG. 3, in the illustrated embodiment, the first and second carbon sublayers 132A, 132B are stitched together separately from the third and fourth carbon sublayers 132C, 132D and the glass layer 130 with a plurality of threads 162. The threads 162 can comprise polyester textured filament yarn or any other suitable material. Referring to FIGS. 4B and 4C, a plurality of threads 162A-162C form a tricot stitch pattern that binds lengthwise oriented carbon fiber bundles 150A, 150B in the first carbon sublayer 132A to the widthwise oriented bundles 152A, 152B in the second carbon sublayer 132B. From the perspective of FIG. 4B, the threads 162A-162C appear to form chains of loops extending in alignment with the lengthwise oriented seams 170 similar to the pillar stitches 160 illustrated in FIG. 4A. But as shown in FIG. 4C, the threads 162A-162C extend transverse to the seams 170 along the outer surfaces of the lengthwise oriented bundles 150A-150B to secure the second carbon sublayer 132B to the first carbon sublayer 132A without the use of any backing material (e.g., the glass layer 130).

From the perspective of FIG. 4B, a first thread 162A forms looped portions 190A and the second thread 162B forms looped portions 190B, which extend in alternating sequence along a first course 192 of looped portions. The first course 192 of the looped portions 190A, 190B extends lengthwise of the liner 110 along the inner surfaces of the widthwise oriented carbon fiber bundles 152A-152n in substantial positional alignment with one of the lengthwise oriented seams 170A. Each looped portion 190A, 190B forms an open loop having an open end and a closed end. As illustrated in FIG. 4B, the thread 162B also forms alternating looped portions 190B' of an adjacent second course 194 of looped portions. A thread 162C forms looped portions 190C that alternate with the looped portions 190B' along the second course 194. It will be understood that the thread 162A forms alternating loop portions of an adjacent course of looped portions (not shown) on the opposite side of the course 192 from the course 194. Similarly, the thread 162C forms alternating looped portions 190C' of the third course 196 of looped portions adjacent the second course 194. It is understood that, like the first thread 162A, each thread 162A-162n used to form the tricot stitch forms alternating looped portions 190A-192n, 190A'-192n' of two adjacent courses of looped portions.

The stitch path of the thread 162B through the courses 192, 194 will now be described in reference to FIGS. 4B and 4C, with the understanding that the stitch path of any of the threads 162A-162n is substantially the same through its respective courses of looped portions. The thread 162B extends along the stitch path to form an alternating sequence looped portions 190B, 190B' in the first and second courses 192, 194 of looped portions. The stitch pattern of the thread 162B will be specifically described in reference to the looped portion 190B that extends along the widthwise oriented bundle 152A and the looped portion 190B' that extends along the widthwise oriented bundle 152B. The looped portion 190B that extends along the widthwise oriented bundle 152A will be referred to as the first looped portion, and the looped portion 190B' that extends along the widthwise oriented bundle 152B will be referred to as the second looped portion. The terms "first" and "second" are used for reference purposes only, to distinguish between the looped portions 190B and 190B' in the following description. It will be understood that the thread 162B repeats the pattern used to form the first and second looped portions 190B, 190B' along the length of the lengthwise oriented bundle of carbon fibers 150A.

Referring specifically to the first looped portion 190B, a first looped portion leg 200 extends generally in the x-direction along the width of the widthwise oriented bundle of carbon fibers 152A. The first looped portion leg 200 connects to a second looped portion leg 202 at the closed end of the first looped portion 190B. From the closed end of the first looped portion 190B, the second looped portion leg 202 extends generally in the negative x-direction along the width of the widthwise oriented bundle of carbon fibers 152A. A vertically oriented leg 204 extends from the second looped portion leg 202 adjacent the open end of the first looped portion 190B through the closed end of an adjacent looped portion 190A generally in the negative z-direction. The vertically oriented leg 204 extends further through a thread passage 176 formed at the intersection 174 between a lengthwise oriented seam 170A and a widthwise oriented seam 172A. From the vertically oriented leg 204, a transverse oriented leg 206 (FIG. 4C) extends generally parallel to the x-y plane. The transverse oriented leg 206 extends from the vertically oriented leg 204 in an angled direction between the x-direction and the negative y-direction. The transverse oriented leg 206 crosses over one lengthwise oriented bundle 150A and one widthwise oriented bundle 152A as it extends along the outer surface of the lengthwise oriented bundle. Another vertically oriented leg 208 extends generally in the z-direction from the transverse oriented leg 206. The vertically oriented leg 208 extends through a thread passage 176 formed at the intersection 174 between a lengthwise oriented seam 170B and a widthwise oriented seam 172B. The vertically oriented leg 208 extends further through the closed end of an adjacent looped portion 190C formed by the third thread 162C. A first looped portion leg 200' of the second looped portion 190B' extends generally in the x-direction along the width of the widthwise oriented bundle of carbon fibers 152B.

The first looped portion leg 200' connects to the second looped portion leg 202' of the second looped portion 190B'. Like the first looped portion leg 202, the first looped portion leg 202' connects to a vertically oriented leg 204', which extends generally in the negative z-direction through the looped end of the looped portion 190C and further through a thread passage 176. Another transverse oriented leg 206' (FIG. 4C) extends generally parallel to the x-y plane. From the vertically oriented leg 204', the transverse oriented leg 206' extends at an angle between the x-direction and y-direction. The transverse oriented leg 206' crosses over the lengthwise oriented bundle 150A and widthwise oriented bundle 152B along the outer surface of the lengthwise oriented bundle. Another vertically oriented leg 208' extends generally in the z direction and connects the transverse bundle 206' to another looped portion 190B of the first course 192 of looped portions. Like the vertically oriented leg 208, the vertically oriented leg 208' extends through a thread passage 176 formed at the intersection 174 between the lengthwise oriented seam 170A and a widthwise oriented seam 172C.

Following the tricot stitch pattern described above, the thread 162B wraps around the lengthwise oriented carbon fiber bundle 150A, sequentially binding the widthwise oriented bundles of carbon fibers 172A-172$n$ to the lengthwise oriented bundle as it extends along the stitch pattern. Similarly, the threads 162A-162$n$ wrap around the length of a respective lengthwise oriented bundle of carbon fibers 170 to sequentially bind the widthwise oriented bundles 172A-172$n$ to the respective lengthwise oriented bundles. The tricot stitch pattern of the threads 162A-162$n$ collectively bind the lengthwise oriented bundles 170 of the first carbon sublayer 132A to the widthwise oriented bundles 172 in the second carbon sublayer 132B and hold the bundles of the first and second sublayers in position independently of securement to the woven glass layer 130.

Although the illustrated embodiment uses the threads 160, 162 to stitch the carbon layer 132 to the glass layer 130, it will be understood that other embodiments can laminate the carbon layer to the glass layer in other ways without departing from the scope of the invention. For example, it is specifically contemplated that other types of stitching or adhesives may be used. Preferably the lamination technique binds the carbon layer 132 to the glass layer 130 in sufficiently loose connection so that the liner 110 can fold along a lengthwise axis when being inserted in to the host pipe 10 (e.g., the stitching is preferably not so dense or tight as to render the liner 110 too stiff to readily fold along a lengthwise axis).

The widthwise oriented carbon fiber bundles 152 of the carbon layer 132 are configured and arranged to provide strength to the host pipe 10 in the hoop direction when the liner 110 is applied to the interior surface 16 of the host pipe wall 12. The widthwise oriented bundles of carbon fibers 152, which are oriented in the hoop direction when the liner is applied to the interior surface 16, are configured to be stronger than the lengthwise oriented bundles of carbon fibers 150. In the illustrated embodiment, each of the lengthwise oriented bundles of carbon fibers 150 includes about the same number of carbon fibers (e.g., about 50,000 fibers, or from about 1000 fibers to about 50,000 fibers, etc.) and has about the same cross-sectional dimensions. Each fiber within each bundle 150 has an elastic modulus of about 35 Msi (about 241,317 MPa). In other embodiments, each fiber within the lengthwise oriented bundles of carbon fibers 150 can have an elastic modulus of from about 33 Msi (about 227,527 MPa) to about 55 Msi (about 379,212 MPa). In the illustrated embodiment, each of the widthwise oriented bundles of carbon fibers 152 includes about the same number of carbon fibers (e.g., about 50,000 fibers, or from about 1000 fibers to about 50,000 fibers, etc.) and has about the same cross-sectional dimensions. Each fiber within each bundle 152 has an elastic modulus of about 35 Msi (about 241,317 MPa). In one or more additional embodiments, the widthwise oriented bundles of carbon fibers 152 can have an elastic modulus of from about 33 Msi (about 227,527 MPa) to about 55 Msi (about 379,212 MPa).

In the illustrated embodiment, the carbon fiber bundle density per unit area (bundles/m$^2$) in sublayers 132A, 132C is less than in the sublayers 132B, 132D. Again, the lengthwise and widthwise bundles 150, 152 have about the same number of fibers in each bundle in the illustrated embodiment. The second and fourth sublayers 132B, 132D include bundles 152 arranged at a higher bundle density than the first and third sublayers 132A, 132C. The more densely arranged second and fourth sublayers 132B, 132D strengthen the host pipe 10 in the hoop direction and provide stronger and stiffer structural reinforcement of the host pipe than the first and third sublayers 132A, 132C, which strengthen the host pipe in the longitudinal direction.

Strength characteristics of the liner can be deduced from the weight per unit area of the carbon fiber content of the liner in each direction. A higher weight per unit area of carbon fibers extending in a particular direction corresponds with higher strength against forces imparted upon the liner in that direction in use. The weight of the widthwise oriented bundles of carbon fibers 152, which extend in the hoop direction of the host pipe 10 in use, per unit area of the liner 110 is preferably at least about two and a half-times as much as the weight per unit area of the lengthwise oriented bundles of carbon fibers 150, which extend in the longitudinal direction of the host pipe in use. In another embodiment, the weight per unit area of the widthwise carbon fibers is at least about two and three quarters-times as much as the weight per unit area of the lengthwise carbon fibers 150. In yet another embodiment, the weight per unit area of the widthwise carbon fibers 152 is at least about three times as much as the weight per unit area of the lengthwise carbon fibers 150. In still another embodiment, the weight per unit area of the widthwise carbon fibers 152 is greater than the weight per unit area of the lengthwise carbon fibers 150. In the illustrated embodiment, the lengthwise oriented bundles of carbon fibers 150 weigh about 270 $g/m^2$, divided substantially equally between the carbon fiber bundles in the first sublayer 132A and the third sublayer 132C. In one or more additional embodiments, the lengthwise oriented bundles of carbon fibers can weigh from about 100 $g/m^2$ to about 1000 $g/m^2$, divided in any suitable ratio among the carbon sublayers which comprise the lengthwise oriented bundles. In the illustrated embodiment, the widthwise oriented bundles of carbon fibers 152 weigh about 766 $g/m^2$, divided substantially equally between the carbon fiber bundles in the second sublayer 132B and the fourth sublayer 132D. In one or more additional embodiments, the widthwise oriented bundles of carbon fibers can weigh from about 100 $g/m^2$ to about 1000 $g/m^2$, divided in any suitable ratio among the carbon sublayers which comprise the widthwise oriented bundles.

When the liner 110 is applied to the interior surface 16 of the host pipe 10, it limits the transmission of forces induced by a pressurized fluid acting upon the liner to the host pipe. Like the glass layer 130, the carbon layer 132 is configured to carry (e.g., be impregnated with) a curable polymeric material such as epoxy. After the liner 110 is applied to the interior surface 16 of the host pipe 10 and allowed to cure, the carbon layer 132 is suspended along with the glass layer 130 in a solid matrix of the polymeric material. Together, the polymeric material and liner 110 line the interior surface 114 of the host pipe 10 and limit the transmission of forces induced by pressurized fluid acting upon the host pipe. To appropriately limit the transmission of forces, the polymeric material and liner 110 may possess a high modulus of elasticity and high tensile strength. For example, in certain embodiments (e.g., where the host pipe is a steel pipe), the liner 110 transmits no more than about 0.4% of the strain induced by pressurized fluid acting upon the liner to the host pipe 10. Thus, the liner 110 substantially prevents further damage to the host pipe 10 caused by forces induced by a pressurized fluid contained in the interior lumen 14. Moreover, because a pressurized fluid tends to continuously impart forces on the host pipe 10, particularly in the hoop direction, the preferential weighting of the carbon fiber content of the liner 110 in the hoop direction reinforces the host pipe against the forces it most frequently encounters.

Referring to FIGS. 1 and 5-8, an exemplary method of installing the liner 110 in the pipe 10 will now be described. Those skilled in the art will appreciate that the method described herein is a conventional "pull-in" method of applying a liner to the interior surface of a pipe such as is described in International Patent Application Publication No. PCT/US2014/011397, which is hereby for all purposes incorporated by reference into the present disclosure. The "pull-in" method described herein is particularly well-suited for pipe lining applications in which the liner 110 is installed in a host pipe 10 that has a relatively small inner diameter (e.g., less than or equal to about 14 inches (about 35.56 cm)) and has two access points 10, 12 spaced apart along the length of the host pipe by a distance. Other methods of applying the liner 110 to the interior surface of this and other types and sizes of host pipes (e.g., eversion, etc.) may also be used without departing from the scope of the invention. However, it will be understood that the illustrated liner 110 is constructed to be particularly well-suited for a pull-in pipe lining application such as is shown and described herein.

Figure 5:
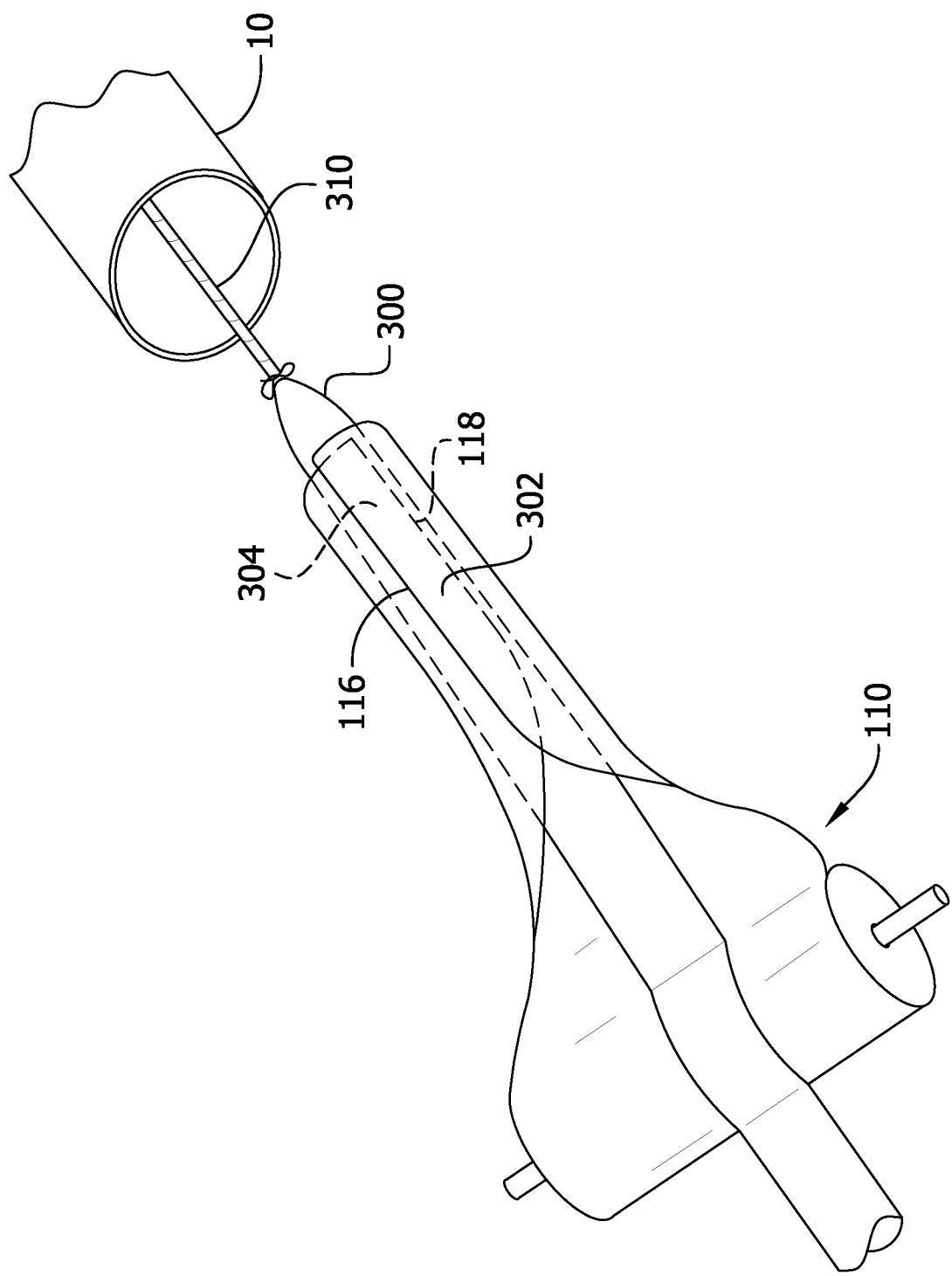
FIG. 5 is a perspective view of the structural fabric wound onto a roll and secured to a carrier tube before being pulled into the host pipe.

Initially, the liner 110 is free of curable polymeric material. Prior to applying the liner 110 to the interior surface 16 of the host pipe 10, the liner 110 is impregnated with a curable polymeric material such as a curable epoxy. Any suitable method for saturating the liner 110 with the curable polymeric material may be used without departing from the scope of the invention. As shown in FIG. 5, the liner 110 is folded along a lengthwise axis around an expandable carrier tube 300 so that a longitudinal edge margin 302 at the first longitudinal edge 116 overlies a longitudinal edge margin 304 at the second longitudinal edge 118. In this configuration, the liner 110 is shaped for insertion into the host pipe 10. With the liner 110 shaped for insertion into the host pipe 10, a technician secures the liner to the carrier tube 300 so that the carrier tube and liner can travel conjointly through the host pipe. The expandable carrier tube 300 can be formed from any suitable material (e.g., polyethylene or other polymeric materials, etc.) and may be coated with a binder (e.g., resin, epoxy, thermosetting binder, etc.) such that carrier tube is ultimately installed in the host pipe 10 with the liner 110.

As shown in FIG. 1, the carrier tube 300 is connected to a pull line 310 that initially extends from a first end outside the manhole opening 28, through the access tube 24, host pipe 10, and access tube 22, to a second end that is secured to the carrier tube outside the manhole opening 26. With the liner 110 folded along a lengthwise axis into a configuration for insertion into the host pipe 10 and secured to the carrier tube 300, an operator pulls the pull line 310 through the access tubes 22, 24 and host pipe 10. The pull line 210, carrier tube 300, and liner 110 travel conjointly through the access tube 22 and host pipe 10 until the liner's second end is positioned adjacent the second access point 20.

Figure 6:
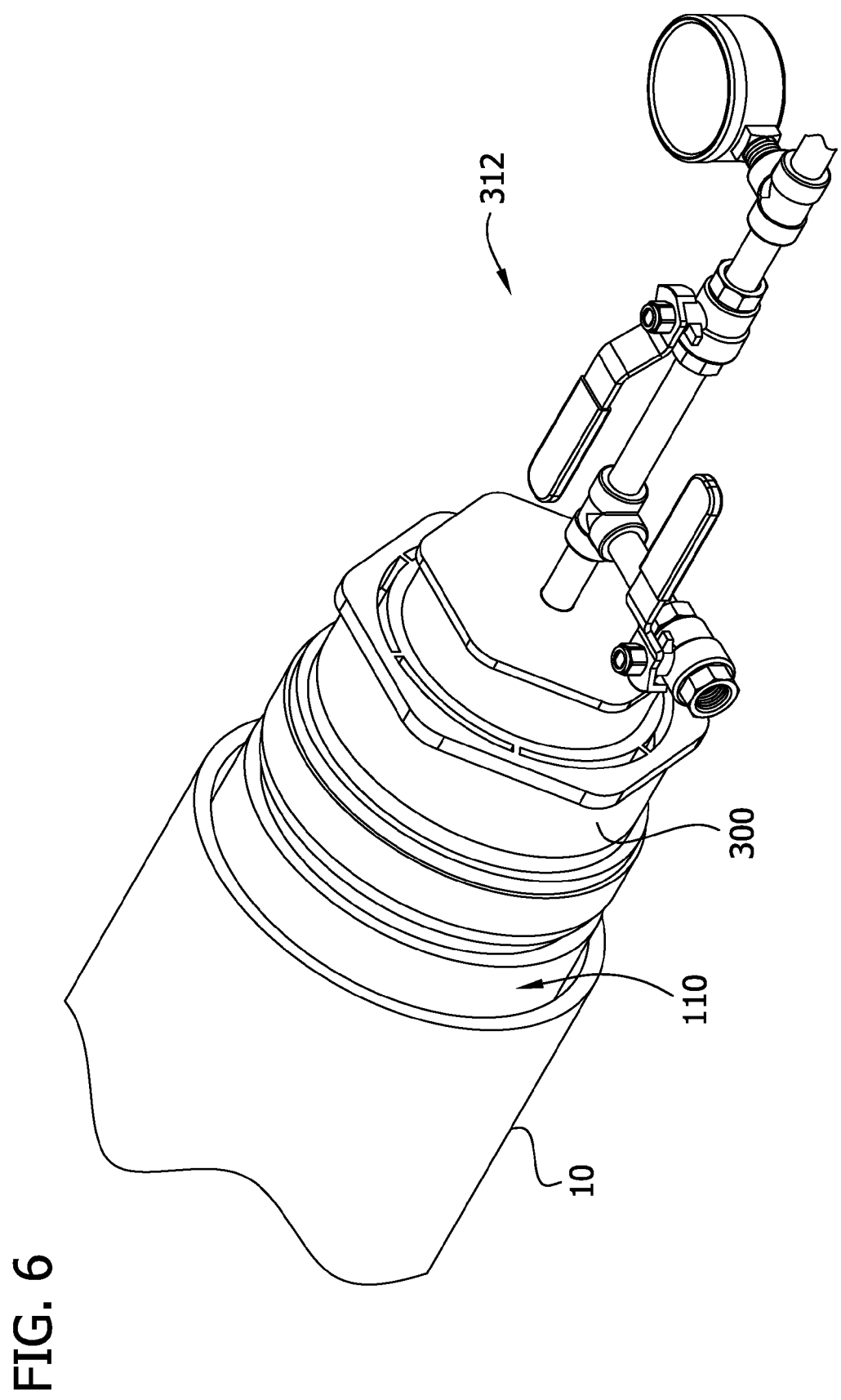
FIG. 6 is a fragmentary perspective of a trailing end of the liner and carrier tube extending from the host pipe and being secured to a pressurized fluid delivery manifold.
Figure 7:
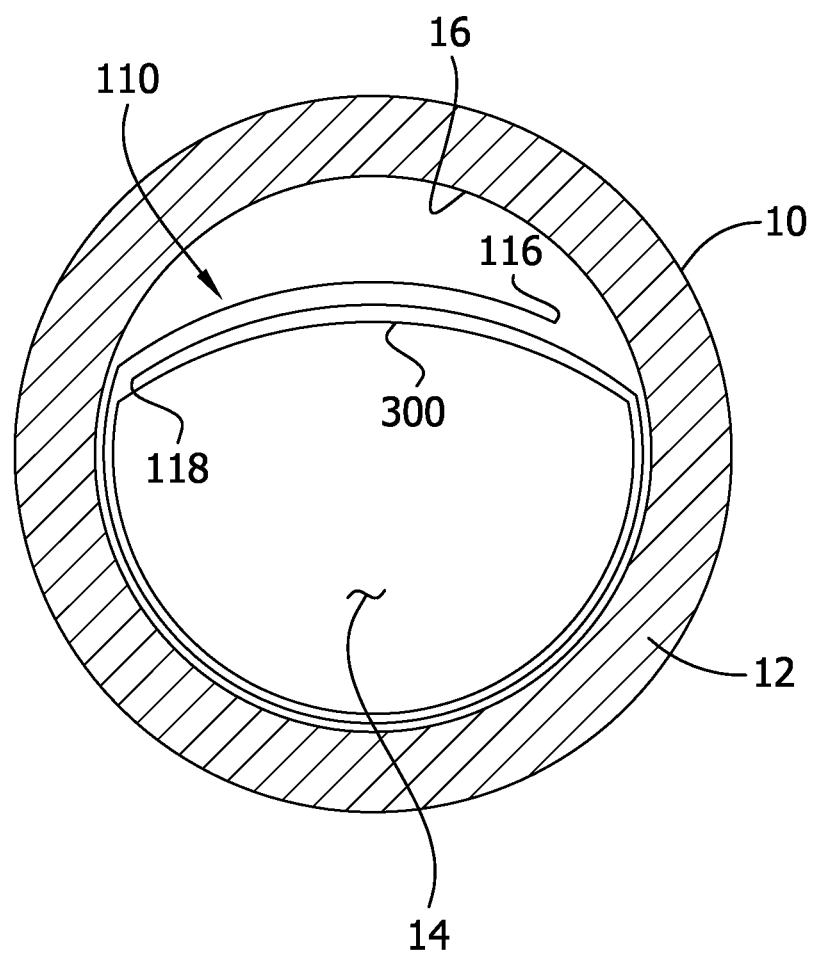
FIG. 7 is a cross-sectional schematic of the liner and carrier tube inserted into the host pipe with the carrier tube being partially inflated.

As shown in FIG. 6, once the liner 110 is in proper position, the operator disconnects the pull line 310 from the carrier tube 300 and installs a fluid delivery manifold, generally indicated at reference number 312. A pressurized fluid source is connected to the fluid delivery manifold 312, and fluid from the pressurized fluid source is delivered through the manifold and into the carrier tube 300. As shown in FIGS. 7 and 8, the fluid radially expands the carrier tube 300 and unfolds the fabric liner 110 until the liner conforms to the shape of the interior surface 14 of the host pipe 10 (FIG. 8). Preferably, a slight overlap between longitudinal edge margins at each of the first and second longitudinal edges 116, 118 remains after the carrier tube 300 is fully expanded. After the carrier tube 300 is fully expanded, the curable polymeric material that is carried by the liner 110 is allowed to cure. If a binder is used with the carrier tube 300, it too is allowed to cure. In certain embodiments, the high pressure fluid used to radially expand the carrier tube 300 has a high temperature to hasten curing. Once curing is complete, the manifold 312 is removed along with any portion of the carrier tube 300 or liner 110 that is unwanted (e.g., portions of the carrier tube or liner that obstruct access to lateral pipes, etc.).

As shown in FIG. 8, the above-described liner 110 and method for installation of the liner yields a lined pipe 10 that is suitable for containing high pressure fluids. The widthwise oriented bundles of carbon fibers 152 extend in the hoop direction from the first longitudinal edge 116 to the second longitudinal edge 118 and substantially limit the transmission of forces induced by the pressurized fluids contained in the interior lumen 14 to the host pipe wall 12. The glass layer 130 provides a watertight barrier between the interior lumen 14 and the original host pipe 110.

The strength characteristics of the liner 110 were subjected to testing using the ASTM D1599-99 standard burst testing procedure. The liner 110 was impregnated with Tyfo® S epoxy and installed in a test pipe. The test pipe included four-foot (122 cm) long sections of eight-inch (20 cm) diameter cardboard pipe and two-foot (61 cm) long sections of restrained end closures. Each section of cardboard pipe was positioned end-to-end between two restrained end closures to form a single test unit. A plurality of test units were positioned end-to-end to form the test pipe. The liner was pulled sequentially through each of the test units, inflated, and cured. After the liner 110 cured, the test pipe was cut to form separate lined test units. The cardboard pipe was removed from the central portion of each test unit so that what remained was a lined restrained end closure defining one end portion of the test unit, a bare cured liner defining a central portion of the test unit, and another lined restrained end enclosure defining another end portion.

The restrained end enclosures of each test unit were installed in a mounting fixture that inhibited axial expansion of the test units during pressurization. Each test unit was pressurized at a rate of about 18 psi/sec (about 0.124 MPa/sec) until the bare liner-formed central portion burst. The pressure at which the test unit burst is the "burst pressure" of the sample. The burst pressure for each test unit and the elapsed time during pressurization was recorded for each sample and is reproduced in Table 1 below.

TABLE 1

| Test Unit # | Burst Pressure - psi (MPa) | Elapsed Time During Pressurization - Sec |
|---|---|---|
| 1 | 1,092 (7.529) | 56 |
| 2 | 1,120 (7.722) | 52 |
| 3 | 1,108 (7.639) | 68 |
| 4 | 1,326 (9.142) | 86 |
| 5 | 1,262 (8.701) | 70 |
| 6 | 1,071 (7.384) | 57 |
| 7 | 1,171 (8.074) | 63 |

As shown in Table 1, after the fabric 110 is installed in a host pipe, it has a burst pressure of at least about 1000 psi (about 6.894759 MPa). Accordingly, in one embodiment the present invention comprises a fabric adapted to be installed as a liner in a host pipe that, when installed, has a burst pressure of at least about 1000 psi (about 6.894759 MPa).

The burst pressures presented in table 1 assume the host pipe in which the liner is installed provides no hoop strength. It will be understood that the host pipe may, in certain embodiments provide additional hoop strength, which enhances the burst characteristics of the lined pipe. In such embodiments, the burst pressure of the lined pipe may substantially exceed 1000 psi (6.894759 MPa).

In addition to being used to line an interior surface of a pipe, the structural fabric making up the liner 110 can be applied to other types of surfaces to provide structural reinforcement and/or waterproofing. For example, in one or more embodiments, after being loaded (e.g., impregnated, coated, impregnated, etc.) with a curable material the structural fabric is applied to the surface of a structure, such as a wall, a column, a beam, a vessel, or the like. The curable material then cures to bind the structural fabric to the surface and from a reinforcing covering over the surface. It is particularly contemplated that the structural fabric will be applied to the surface such that the widthwise oriented bundles of carbon fibers 152 extend substantially parallel to an axis of the structure along which the structure is likely to experience forces. In certain embodiments, mechanical anchors may be used to fix the structural fabric in place on the surface while and/or after the curable material cures.

One aspect of the present invention may be described as: a structural fabric for applying to a surface, the structural fabric being configured to be loaded with a curable material, applied to the surface, and cured to form a reinforcing covering attached to the surface, the structural fabric having a length and a width and comprising glass reinforcing fibers forming a glass layer and a carbon reinforcing fibers forming a carbon layer, the carbon layer being laminated to the glass layer, the carbon layer comprising a first sublayer and a second sublayer, the first sublayer comprising carbon fibers arranged in widthwise oriented bundles and the second sublayer comprising carbon fibers arranged in lengthwise oriented bundles, the lengthwise oriented bundles and widthwise oriented bundles being nonwoven and being laminated together to form the form the carbon layer.

As yet another part of said one aspect, the glass layer and carbon layers are laminated to each other by stitching.

Another aspect of the present invention may be described as: a structural fabric for being applied to a surface, the structural fabric being configured to be loaded with a curable material, applied to the surface, and cured to form a reinforcing covering bound to the surface, the structural fabric having a length and a width and comprising carbon reinforcing fibers, the carbon reinforcing fibers being arranged in a plurality of widthwise oriented bundles of carbon fibers and a plurality of lengthwise oriented bundles of carbon fibers, the widthwise oriented bundles being arranged in side-by-side engagement along the length of the liner and the lengthwise oriented bundles being arranged in side-by-side engagement along the width of the liner, the lengthwise and widthwise oriented bundles being nonwoven and being laminated to one another to form a unitary fabric sheet, the widthwise oriented bundles having a higher weight per unit area than the lengthwise oriented bundles.

Yet another aspect of the present invention may be described as: a structural fabric for being applied to a surface, the structural fabric being configured to be loaded with a curable material, applied to the surface, and cured to form a reinforcing covering bound to the surface, the structural fabric comprising a waterproofing layer and a reinforcing layer, the waterproofing layer comprising glass fibers woven together, the reinforcing layer comprising carbon fibers arranged in lengthwise oriented bundles and widthwise oriented bundles, the widthwise oriented bundles having a higher weight per unit area than the lengthwise oriented bundles.

As another part of said another aspect, the glass fibers are woven together in something other than a plain weave.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A liner for lining an interior surface of a host pipe at least between two access points of the host pipe separated by a distance, the liner including first and second ends and a length extending from the first end to the second end, the length of the liner being at least as long as the distance between the access points of the host pipe to cover an interior surface of the host pipe in the longitudinal direction from one of the two access points to the other of the two access points when the liner is applied to the interior surface of the host pipe, the liner further having first and second longitudinal edges and a width extending from the first longitudinal edge to the second longitudinal edge, the width of the liner being at least as long as an interior hoop dimension of the host pipe to cover the interior surface of the host pipe in the hoop direction when the liner is applied to the interior surface of the host pipe, the liner comprising:
   a strengthening layer including bundles of strengthening fiber extending lengthwise of the liner and bundles of strengthening fiber extending widthwise of the liner; and
   a watertight layer comprising fibers spanning substantially continuously the length and the width of the liner, the fibers being arranged to be impregnated with a curable polymer and to provide a watertight barrier that is substantially free of pinholes when the watertight layer is impregnated with the curable polymer, applied to the interior surface of the pipe, and cured, the watertight layer being laminated to the strengthening layer.

2. A liner as set forth in claim 1 wherein the watertight layer comprises a plurality of first glass fibers and a plurality of second glass fibers extending transversely to the first glass fibers.

3. A liner as set forth in claim 2 wherein first glass fibers are arranged in bundles and the second glass fibers are arranged in bundles, the bundles of first glass fibers being interwoven with the bundles of second glass fibers in a weave pattern in which the bundles of one of the first glass fibers and second glass fibers float over at least two adjacent bundles of the other of the first and second glass fibers.

4. A liner as set forth in claim 2 wherein the first and second glass fibers are interwoven in a weave pattern, the weave pattern being one of a satin weave and a twill weave.

5. A liner as set forth in claim 1 wherein the lengthwise oriented bundles of strengthening fiber comprise carbon fiber bundles extending from the first end to the second end of the liner, and the widthwise oriented bundles of strengthening fiber comprise carbon fiber bundles extending from the first longitudinal edge of the liner to the second longitudinal edge of the liner.

6. A liner as set forth in claim 5 wherein the widthwise oriented strengthening fibers weigh more per unit area of the liner than the lengthwise oriented strengthening fibers.

7. A lined pipe comprising:
   a host pipe having a length, a circumference, a wall including an interior surface defining an interior lumen, and at least two access points separated by a distance; and
   a tubular composite liner lining the host pipe on the interior surface of the host pipe at least between the two access points, the tubular composite liner having opposite first and second ends and opposite longitudinal edges, the composite liner comprising,
      a strengthening layer including bundles of strengthening fiber extending along the length of the host pipe and bundles of strengthening fiber extending along the circumference of the host pipe;
      a watertight layer comprising fibers spanning substantially continuously the length and the width of the liner, the fibers in the watertight layer being impregnated with a cured polymer and providing a watertight barrier that is substantially free of pinholes, the watertight layer being laminated to the strengthening layer.

8. A lined pipe as set forth in claim 7 wherein the watertight layer of the tubular composite liner comprises a plurality of first glass fibers and a plurality of second glass fibers extending transversely to the first glass fibers.

9. A lined pipe as set forth in claim 8 wherein the first glass fibers are arranged in bundles and the second glass fibers are arranged in bundles, the bundles of the first glass fibers being interwoven with the bundles of the second glass fibers in a weave pattern in which the bundles of one of the first and second glass fibers float over at least two adjacent bundles of the other of the first and second glass fibers.

10. A lined pipe as set forth in claim 8 wherein the first glass fibers are interwoven with the second glass fibers in a weave pattern, the weave pattern being one of a satin weave and a twill weave.

11. A lined pipe as set forth in claim 7 wherein the lengthwise oriented bundles of strengthening fiber comprise carbon fiber extending from the first end to the second end of the liner, and the widthwise oriented bundles of strengthening fiber comprise carbon fiber extending between the opposite longitudinal edges of the liner.

12. A lined pipe as set forth in claim 11 wherein the widthwise oriented strengthening fibers weigh more per unit area of the tubular composite liner than the lengthwise oriented strengthening fibers.

13. A line pipe as set forth in claim 7 wherein the tubular composite liner is water tight up to a pressure of at least about 600 prig.

14. A liner for lining an interior surface of a host pipe at least between two access points of the host pipe separated by a distance, the liner comprising first and second ends and a length extending from the first end to the second end, the length of the liner being at least as long as the distance between the access points of the host pipe to cover an interior surface of the host pipe in the longitudinal direction from one of the two access points to the other of the two access points when the liner is applied to the interior surface of the host pipe, the liner further having first and second longitudinal edges and a width extending from the first longitudinal edge to the second longitudinal edge, the width of the liner being at least as long as an interior hoop dimension of the host pipe to cover the interior surface of the host pipe in the hoop direction when the liner is applied to the interior surface of the host pipe, the liner comprising a plurality of lengthwise oriented bundles of strengthening fibers extending from the first end to the second end of the liner and a plurality of widthwise oriented bundles of strengthening fibers extending transverse to the lengthwise oriented bundles from the first longitudinal edge to the second longitudinal edge of the liner, the lengthwise oriented bundles and widthwise oriented bundles being connected to each other to form a unitary liner configured to be folded about an axis extending lengthwise of the liner so that a longitudinal edge margin at the first longitudinal edge overlies a longitudinal edge margin at the second longitudinal edge into a shape for insertion into the host pipe, wherein each of the widthwise oriented bundles and each of the lengthwise oriented bundles of fibers has a respective weight and occupies a respective area of the liner extending along a length and a width of the respective bundle, the weight per unit area of the liner of each of the widthwise oriented bundles of strengthening fibers being at least about two and a half-times as much as the weight per unit area of the liner of each of the lengthwise oriented bundles of strengthening fibers.

15. A liner as set forth in claim 14 wherein the strengthening fibers comprise carbon fibers and the carbon fibers in the plurality of widthwise oriented bundles weigh from about 100 g/m2 to about 1000 g/m2.

16. A liner as set forth in claim 14 wherein the liner is free of curable polymeric material.

17. A liner as set forth in claim 14 further comprising a watertight layer.

18. A liner as set forth in claim 17 wherein the watertight layer comprises glass fibers spanning a length and a width of the glass layer.

19. A liner as set forth in claim 18 wherein the watertight layer comprises a plurality of bundles of glass fibers woven in one of a satin weave and a twill weave.

20. A liner as set forth in claim 18 wherein the fibers in the lengthwise oriented bundles of strengthening fibers comprise carbon fibers and fibers in the widthwise oriented bundles of strengthening fibers comprise carbon fibers.

21. A liner as set forth in claim 14 wherein the lengthwise oriented bundles and the widthwise oriented bundles each have substantially the same number of fibers.

22. A liner as set forth in claim 14 wherein the widthwise oriented bundles of carbon fiber each have an elastic modulus of from about 33 Msi to about 55 Msi.

23. A liner as set forth in claim 14 in combination with the host pipe.

* * * * *